(12) United States Patent
Lee et al.

(10) Patent No.: US 9,974,124 B2
(45) Date of Patent: May 15, 2018

(54) LED CONTROLLERS FOR DIMMING AT LEAST ONE LED STRING

(71) Applicant: Leadtrend Technology Corporation, Hsinchu (TW)

(72) Inventors: Ching-Tsan Lee, Hsinchu (TW); Mao-Shih Li, Hsinchu (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 723 days.

(21) Appl. No.: 14/475,672

(22) Filed: Sep. 3, 2014

(65) Prior Publication Data

US 2015/0069926 A1    Mar. 12, 2015

(30) Foreign Application Priority Data

Sep. 6, 2013 (TW) .............................. 102132127 A

(51) Int. Cl.
*H05B 37/02* (2006.01)
*H05B 33/08* (2006.01)

(52) U.S. Cl.
CPC ..... *H05B 33/0815* (2013.01); *H05B 33/0827* (2013.01); *H05B 33/0851* (2013.01); *Y02B 20/347* (2013.01)

(58) Field of Classification Search
CPC .......................... H05B 33/0815; H05B 33/0851
USPC ............................... 315/291, 209 R; 307/311
See application file for complete search history.

(56) References Cited

U.S. PATENT DOCUMENTS

| 7,388,359 | B1* | 6/2008 | Ling | H02M 3/156 |
| | | | | 323/284 |
| 7,898,187 | B1* | 3/2011 | Mei | H05B 33/0815 |
| | | | | 315/185 S |
| 2012/0176048 | A1* | 7/2012 | Li | H05B 33/0815 |
| | | | | 315/186 |
| 2014/0132176 | A1* | 5/2014 | Xu | H05B 33/0815 |
| | | | | 315/240 |

FOREIGN PATENT DOCUMENTS

TW    I444091    2/2013

* cited by examiner

*Primary Examiner* — Douglas W Owens
*Assistant Examiner* — Amy Yang
(74) *Attorney, Agent, or Firm* — McClure, Qualey & Rodack, LLP

(57) ABSTRACT

Disclosed are LED controllers for dimming. An LED controller includes a current driver, a pulse-width modulator, a feedback circuit, and a decoupling circuit. The current driver, selectively in response to a dimming signal, causes a driving current flowing through one LED string. The dimming signal is capable of defining a dimming ON period and a dimming OFF period. The pulse-width modulator generates a PWM signal to control a power switch, in order to buildup a driving voltage at a power node of the LED string. The PWM signal is generated in response to a compensation signal. The feedback circuit, based upon a feedback voltage from the light emitting device, drives a compensation capacitor to generate the compensation signal. The decoupling circuit defines a decoupling period at the start of the dimming ON period and causes the feedback circuit not driving the capacitor during the decoupling period.

18 Claims, 6 Drawing Sheets

LED CONTROLLERS FOR DIMMING AT LEAST ONE LED STRING

CROSS-REFERENCE TO RELATED APPLICATION

This application claims priority to and the benefit of Taiwan Application Series Number 102132127 filed on Sep. 6, 2013, which is incorporated by reference in its entirety.

BACKGROUND

The present disclosure relates generally to control circuit and method for driving light emitting diodes (LEDs), and more particularly to the control of dimming LEDs.

LEDs have obtained popularity in the field of lighting and backlight modules, due to their excellent lighting efficiency, compact product size, and long lifespan. For instance, the backlight modules used in computer monitors or televisions have largely turned to employ LEDs as their light sources, instead of cold cathode fluorescent lamps that were commonly used years ago.

FIG. 1 demonstrates a LED driver 10 in the art, which drives four LED strings S1~S4 in parallel. Even though each LED strings in FIG. 1 has LEDs connected in series, one LED string in other example might have only one LED. A booster 12 boosts up an input power voltage $V_{IN}$ and generates a driving power voltage $V_{OUT}$ to a common power node of the LED strings S1~S4. Current control circuits CD1~CD4 govern the driving current $I1_{LED}$~$I4_{LED}$ through LED strings S1~S4 respectively. LED controller 14 controls the operation of the current control circuit CD1~CD4 and the booster 12.

FIG. 2 shows a conventional LED controller 14 in the art. A minimum voltage selector 20 provides a minimum feedback voltage $V_{FBMIN}$ based on the minimum of the feedback voltages $V1_{FB}$~$V4_{FB}$, which are the voltages at feedback nodes FB1~FB4 of LED strings S1~S4. Transconductor 22 drives a compensation node COM based on the difference between the minimum feedback voltage $V_{FBMIN}$ and a reference voltage $V_{REF}$, so as to charge or discharge a compensation capacitor 23 and to build a compensation voltage $V_{COM}$. A pulse-width modulator 24, in response to the compensation voltage $V_{COM}$, generates a PWM signal $S_{DRV}$, which turns ON and OFF the power switch 28 periodically. Simply speaking, minimum voltage selector 20, transconductor 22, pulse-width modulator 24, booster 12, and LED strings S1~S4 as a whole forms a loop with a negative loop gain, capable of stabilizing the minimum feedback voltage $V_{FBMIN}$ at the reference voltage $V_{REF}$.

Constant current driver CC1~CC4 correspond to current control circuits CD1~CD4 respectively. Only the constant current driver CC1 is detailed herein because other constant current drivers are analogous in view of the teaching of the constant current driver CC1. The constant current driver CC1 has an operational amplifier 30, which is configured to make a current sense voltage $V1_{CS}$ about the same with the setting voltage $V_{CSSET}$, which, depending on the dimming signal $S_{DIM}$, is either 0V or a predetermined voltage $V_{CSON}$. As the current sense voltage $V1_{CS}$, in a way, represents the driving current $I1_{LED}$, the constant current driver CC1 can stabilize the driving current $I1_{LED}$.

The dimming signal $S_{DIM}$ is capable of adjusting the brightness of the LED strings S1~S4, or dimming the LED strings S1~S4. The dimming signal $S_{DIM}$ is a PWM signal, for example. When the dimming signal $S_{DIM}$ is "1" in logic, the minimum feedback voltage $V_{FBMIN}$ could be stabilized to be about the reference voltage $V_{REF}$ and each of driving currents $I1_{LED}$~$I4_{LED}$ is about a constant corresponding to the predetermined voltage $V_{CSON}$, such that LED strings S1~S4 emit light continuously and stably. In the opposite, when the dimming signal $S_{DIM}$ is "0" in logic, LED controller 14 constantly turns OFF the power switch 28 in the booster 12, and all the driving currents $I1_{LED}$~$I4_{LED}$ are to be 0 A, such that LED strings S1~S4 do not emit light. This kind of dimming control is generally called PWM dimming. Here in this specification, a dimming ON period $T_{DIM\text{-}ON}$ refers to the period of time when the dimming signal $S_{DIM}$ is "1", and a dimming OFF period $T_{DIM\text{-}OFF}$ to the period of time when the dimming signal $S_{DIM}$ is "0". A dimming duty cycle, the ratio of one dimming ON period $T_{DIM\text{-}ON}$ to one cycle time of the dimming signal $S_{DIM}$, is a factor substantially corresponding to the brightness of the LED strings S1~S4. Dimming linearity refers to the correlation between the brightness of a light source and the dimming duty cycle. Perfect dimming linearity means the brightness of a light source is entirely proportional to the dimming duty cycle, and is always a dream that designers of lighting apparatuses or lighting controllers desire to achieve.

SUMMARY

Embodiments of the present invention provide a control circuit capable of controlling the light dimming of a light emitting device. A current driver is in response to a dimming signal and selectively causes a driving current flowing through the light emitting device. The dimming signal is capable of defining a dimming ON period and a dimming OFF period. A pulse-width modulator generates a PWM signal to control a power switch, in order to build up a driving voltage at a power node of the light emitting device. The PWM signal is generated in response to a compensation signal. A feedback circuit, based upon a feedback voltage from the light emitting device, drives a compensation capacitor to generate the compensation signal. A decoupling circuit defines a decoupling period at the start of the dimming ON period and causes the feedback circuit not driving the capacitor during the decoupling period.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
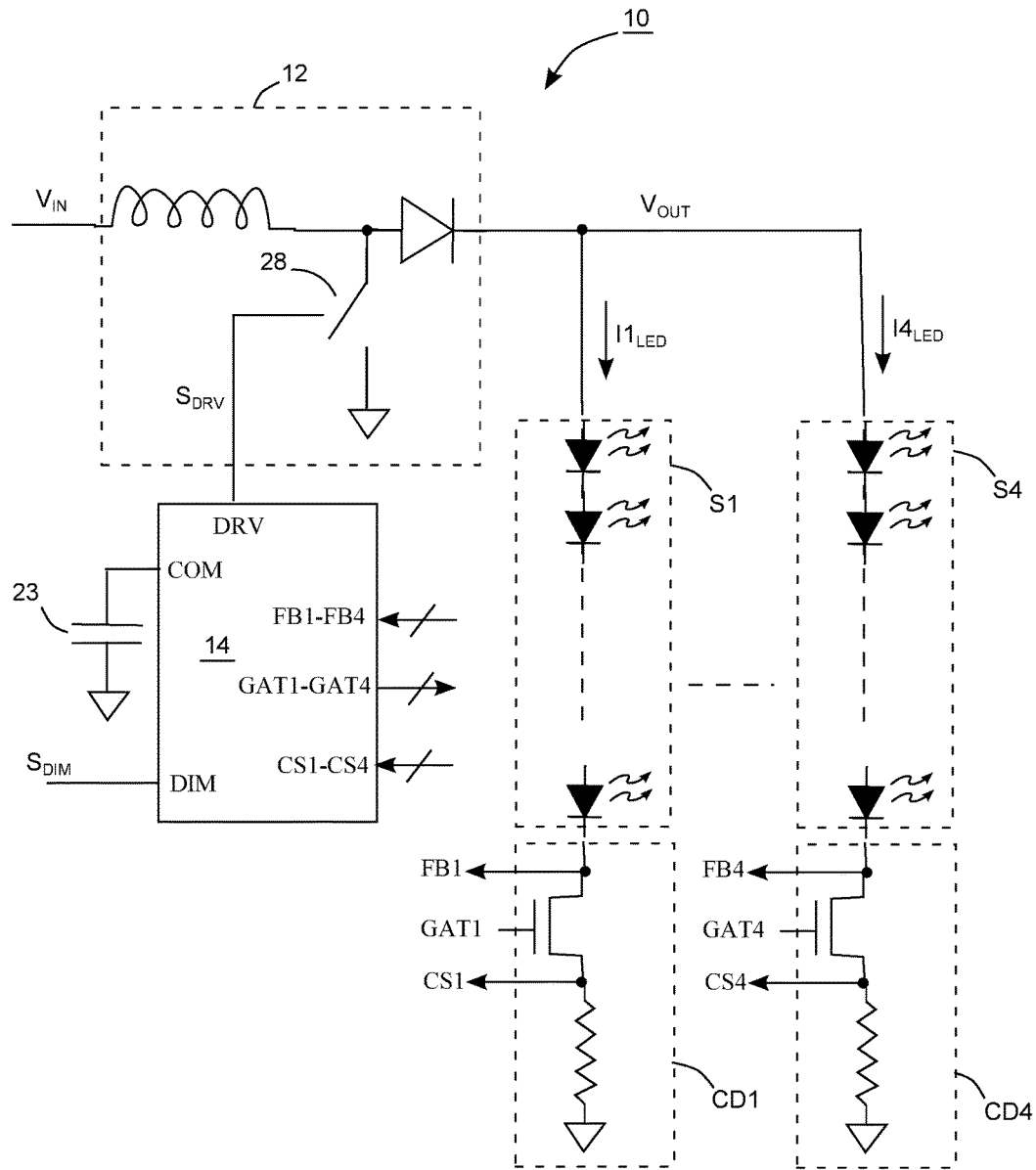
FIG. 1 demonstrates a LED driver 10 in the art, which drives four LED strings S1~S4 in parallel.
Figure 2:
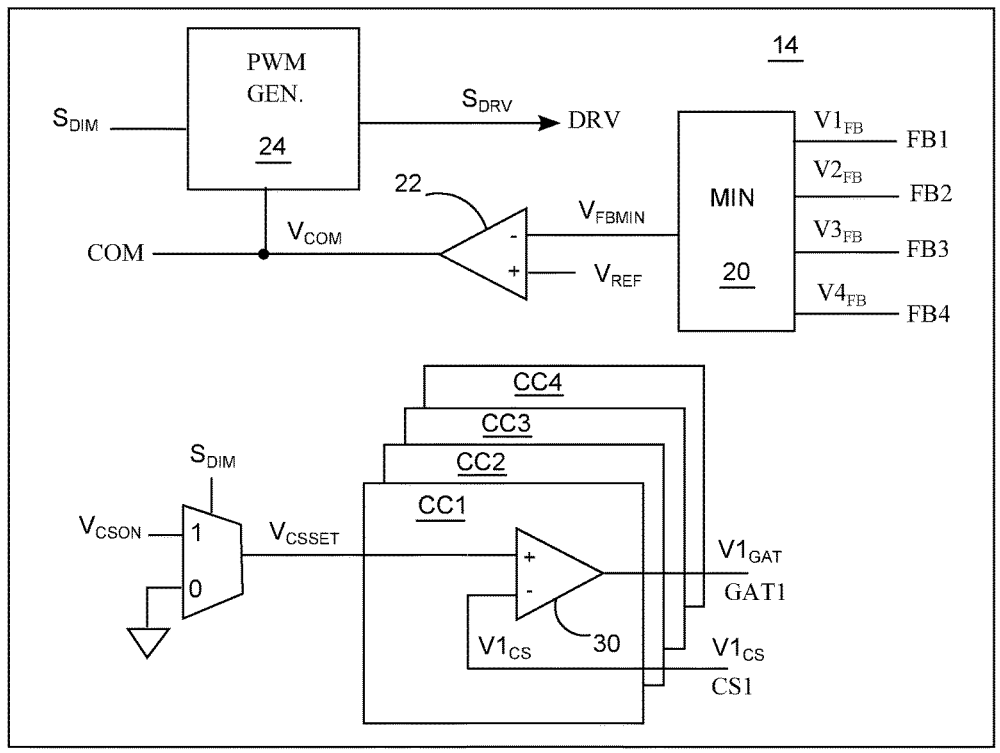
FIG. 2 shows a conventional LED controller.
Figure 3:
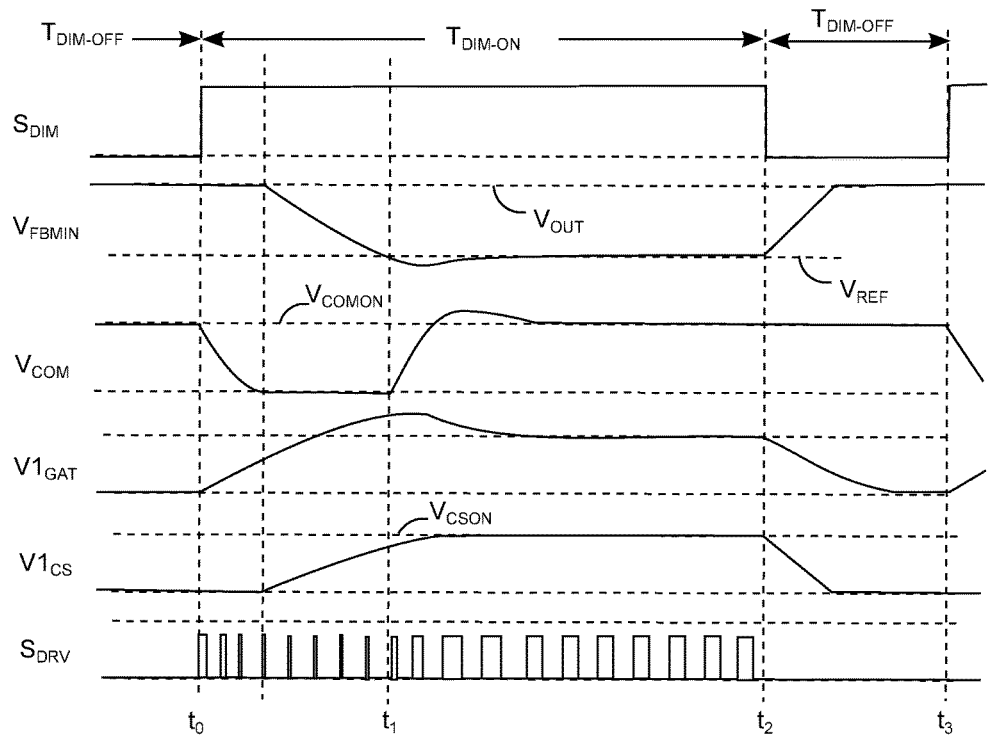
FIG. 3 shows waveforms possibly resulted from the circuits demonstrated in FIGS. 1 and 2.

FIG. 3 shows waveforms possibly resulted from the circuits demonstrated in FIGS. 1 and 2, and has, from top to bottom, the dimming signal $S_{DIM}$, the minimum feedback voltage $V_{FBMIN}$, the compensation voltage $V_{COM}$, the control voltage $V1_{GAT}$ at the control node GAT1 in the constant current driver CC1, the current sense voltage $V1_{CS}$, and the PWM signal $S_{DRV}$.

A short dimming ON period $T_{DIM-ON}$ could worsen dimming linearity or cause flickering to the LED strings S1~S4 in FIG. 1 due to the limited driving ability of the constant current driver CC1.

Please refer to FIG. 3. It is a common practice that, during the dimming OFF period $T_{DIM-OFF}$, the current sense voltage $V1_{CS}$ is 0V and the compensation voltage $V_{COM}$ is held unchanged, staying as what it was at the end of a previous dimming ON period $T_{DIM-ON}$, as demonstrated in the dimming OFF period $T_{DIM-OFF}$ before $t_0$ when the compensation voltage is about a value $V_{COMON}$. As there is no current going through the LED strings S1~S4 during the dimming OFF period $T_{DIM-OFF}$, the voltage drop across each LED string is 0V, and the minimum feedback voltage $V_{FB-MIN}$ will be about the same as the driving power voltage $V_{OUT}$, which could be as high as several tens volt.

At time $t_0$, the dimming signal $S_{DIM}$ turns to "1" from "0" and a dimming ON time $T_{DIM-ON}$ starts. The operational amplifier 30 starts to pull up the control voltage $V1_{GAT}$, in hopes of raising the current sense voltage $V1_{CS}$ to the predetermined voltage $V_{CSON}$ as soon as possible. The control node GAT1 always has a parasitic capacitive load, however, which could be considerably large due to the existence of an external power transistor controlling the driving current $I1_{LED}$, and often causes the control voltage $V1_{GAT}$ to ramp up slowly. Only after the control voltage $V1_{GAT}$ exceeds a certain threshold, the current sense voltage $V1_{CS}$ starts slowly approaching to the predetermined voltage $V_{CSON}$, in order to make the driving current $I1_{LED}$ to stay at its steady state during the dimming ON period. The predetermined voltage $V_{CSON}$ is about 0.4V for example.

As long as the driving current $I1_{LED}$ increases, the minimum feedback voltage $V_{FBMIN}$ drops. Nevertheless, at time $t_0$ when the driving current $I1_{LED}$ is still 0 A, the minimum feedback voltage $V_{FBMIN}$ is so high and exceeds the reference voltage $V_{REF}$, such that the transconductor 22 in the feedback loop discharges the compensation capacitor 23 and abruptly pulls down the compensation voltage $V_{COM}$. As known in the art, a low compensation voltage $V_{COM}$ induces the PWM signal $S_{DRV}$ with a small duty cycle, as demonstrated by the PWM signal $S_{DRV}$ in the period from time $t_0$ to $t_1$.

At time $t_1$, the minimum feedback voltage $V_{FBMIN}$ has dropped below the reference voltage $V_{REF}$, and the compensation voltage $V_{COM}$ starts to rise and approach the value $V_{COMON}$, which is the steady value for the compensation voltage $V_{COM}$ during the dimming ON period $T_{DIM-ON}$.

At time $t_2$, a dimming ON period $T_{DIM-ON}$ ends and a dimming OFF period $T_{DIM-OFF}$ follows. Apparently from the period between times $t_1$ and $t_2$, for a dimming ON period $T_{DIM-ON}$, the minimum feedback voltage $V_{FBMIN}$ finally stabilizes to equal to the reference voltage $V_{REF}$, and the current sense voltage $V1_{CS}$ to the predetermined voltage $V_{CSON}$, which corresponds to a steady value of the driving current $I1_{LED}$~$I4_{LED}$.

The compensation voltage $V_{COM}$ is far below the value $V_{COMON}$ during the starting period from $t_0$ to $t_1$. As the compensation voltage $V_{COM}$ decides the power transferred to the LED strings S1~S4, the power delivered during this starting period is much less than what the LED strings S1~S4 need during their steady condition. The current sense voltage $V1_{CS}$, as a result, ramps up slowly and it inevitably takes a relatively long time for the current sense voltage $V1_{CS}$ to reach the predetermined voltage $V_{CSON}$. This phenomenon implies that the LED string S1~S4 might not have been fully driven before the beginning of the dimming OFF time $T_{DIM-OFF}$ if the dimming ON time $T_{DIM-ON}$ is very short, and poor dimming linearity is expected. Furthermore, this phenomenon could cause unfriendly flickering when the dimming ON time $T_{DIM-ON}$ is short.

Figure 4:
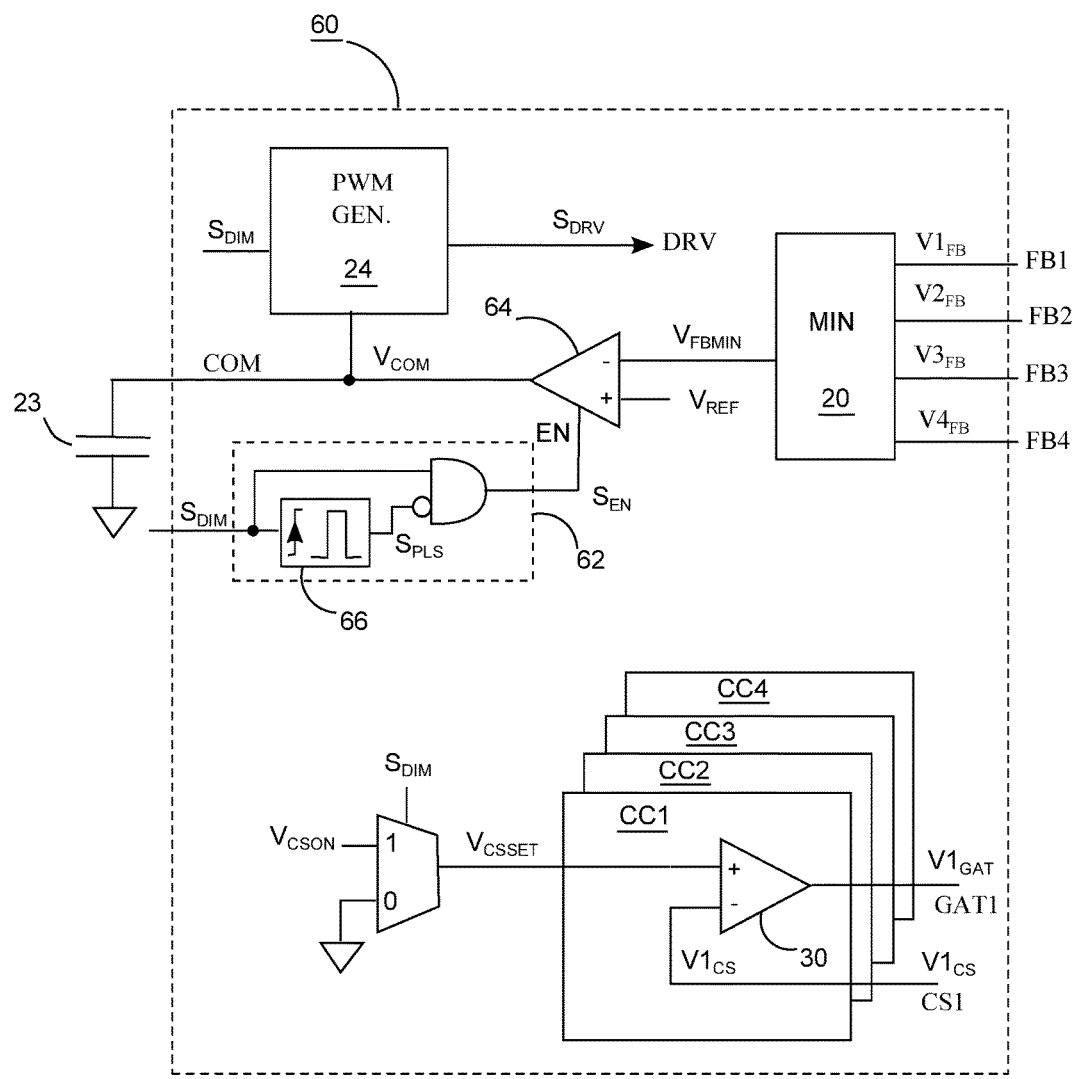
FIG. 4 demonstrates a LED controller according to one embodiment of the invention.

FIG. 4 demonstrates a LED controller 60 according to one embodiment of the invention, which controls the light emitting of 4 LED strings S1~S4. The invention is not limited to however. One embodiment of the invention controls only one LED string, and another might control more than four LED strings. The LED controller 60 has some parts similar or the same with some parts of the LED controller 14 in FIG. 2, and details of these parts are omitted herein for brevity because they are comprehensible to persons in the art.

Unlike the LED controller 14 in FIG. 2, the LED controller 60 has an additional decoupling circuit 62 connected to the EN node of the transconductor 64. The decoupling circuit 62 provides enabling signal $S_{EN}$ in response to the dimming signal $S_{DIM}$. If the enabling signal $S_{EN}$ is "1" in logic, the transconductor 64, which is a kind of a feedback circuit, charges or discharges the compensation capacitor 23 based on the difference between the minimum feedback voltage $V_{FBMIN}$ and the reference voltage $V_{REF}$. In the opposite, when the enabling signal $S_{EN}$ is "0" in logic, the output of the transconductor 64 becomes high impedance and the compensation voltage $V_{COM}$ is held to have the same value as it was just before the enabling signal turned to "0".

In one embodiment, the decoupling circuit 62 has a rising-edge-triggered pulse generator 66 and a logic gate. The rising-edge-triggered pulse generator 66 provides a pulse with a pulse width when the dimming signal $S_{DIM}$ is having a rising edge, and this pulse width defines a decoupling period $T_{FORCE}$, which starts at the beginning of the dimming ON period $T_{DIM-ON}$. This pulse width could be fixed to be 10 micro seconds, or two switch cycle times of the PWM signal $S_{DRV}$, for example. Derivable from FIG. 4, the enabling signal $S_{EN}$ is "0" during both the dimming OFF period $T_{DIM-OFF}$ and the decoupling period $T_{FORCE}$, and is "1" during the dimming ON period $T_{DIM-ON}$ except the decoupling period $T_{FORCE}$.

Figure 5:
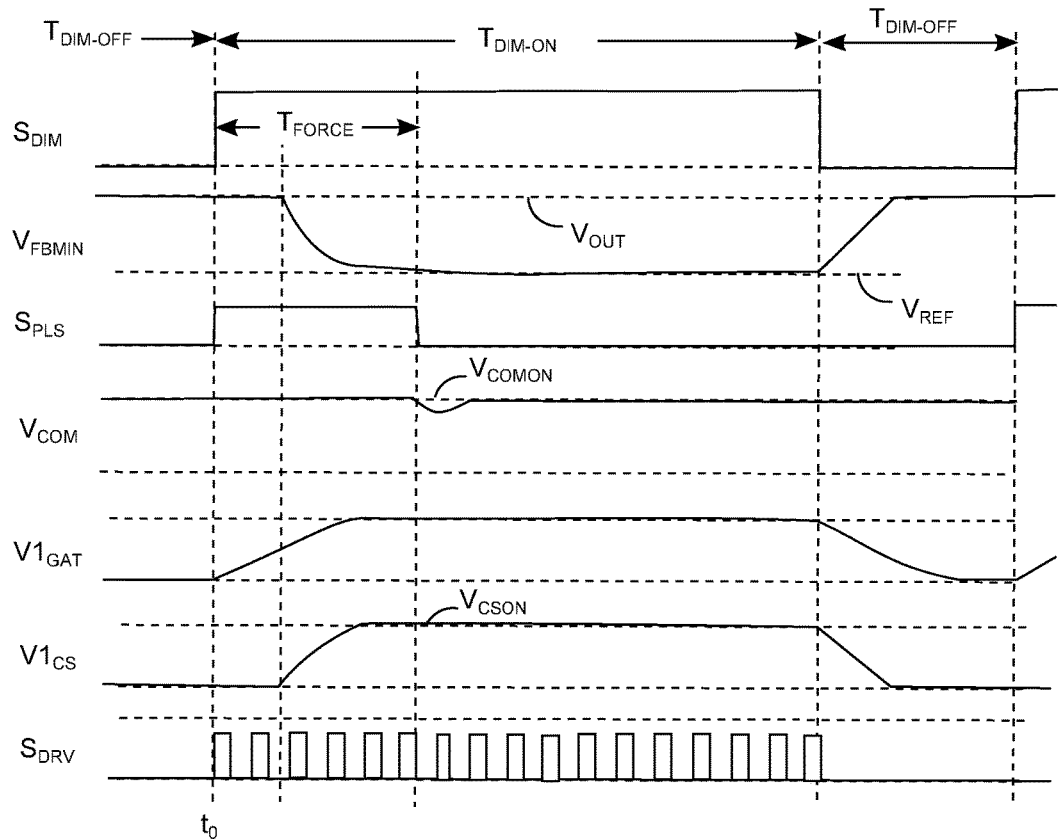
FIG. 5 shows waveforms for signals when the LED controller of FIG. 4 replaces the LED controller in FIG. 1.

FIG. 5 shows waveforms for signals when the LED controller 60 of FIG. 4 replaces the LED controller 14 in FIG. 1. From top to bottom, the waveforms in FIG. 5 are the dimming signal $S_{DIM}$, the minimum feedback voltage $V_{FBMIN}$, and the pulse signal $S_{PLS}$, the control voltage $V1_{GAT}$, the current sense voltage $V1_{CS}$, and the PWM signal $S_{DRV}$.

As shown in FIG. 5, during the decoupling period $T_{FORCE}$, which is a beginning period of time within the dimming ON period $T_{DIM-ON}$, the compensation voltage $V_{COM}$ is held to be the value $V_{COMON}$, as it was at the end of the previous dimming ON period $T_{DIM-ON}$, because the output of the transconductor 64 is in high impedance, not driving the compensation capacitor 23. What is shown in the beginning period of the dimming ON period $T_{DIM-ON}$ in FIG. 5 is very different with the same period of time in FIG. 3, which shows the compensation voltage $V_{COM}$ dropping quickly below the value $V_{COMON}$ at the beginning of the dimming ON period $T_{DIM-ON}$. The compensation voltage $V_{COM}$ in FIG. 5 is able to make the PWM signal $S_{DRV}$ have a high duty cycle at the beginning of the dimming ON period $T_{DIM-ON}$, and, at the same time, immediately causes the booster 12 to transfer or deliver the relatively-high power which the LED strings S1~S4 require for steadily emitting light during a dimming ON period $T_{DIM-ON}$. It is predictable that the current sense voltage $V1_{CS}$ and the minimum feedback voltage $V_{FBMIN}$, as shown in FIG. 5, both soon reach to their steady values, respectively, which are the predetermined voltage $V_{CSON}$ and the reference voltage $V_{REF}$.

After the decoupling period $T_{FORCE}$, the enabling signal $S_{EN}$ becomes "1" in logic, and the transconductor 64 starts driving the compensation capacitor 23 in response to the difference between the minimum feedback voltage $V_{FBMIN}$ and the reference voltage $V_{REF}$ until the start of the dimming OFF period $T_{DIM-OFF}$.

In comparison with what is shown in FIG. 3, the dimming ON period $T_{DIM-ON}$ in FIG. 5 starts with the current sense voltage $V1_{CS}$ and the minimum feedback voltage $V_{FBMIN}$ both approaching to their steady values in a relatively quick rate. Accordingly, if the LED controller 60 in FIG. 1 is replaced by the LED control 14, dimming linearity is probably improved and the flickering to the LED strings S1~S4 might be eliminated.

Figure 6:
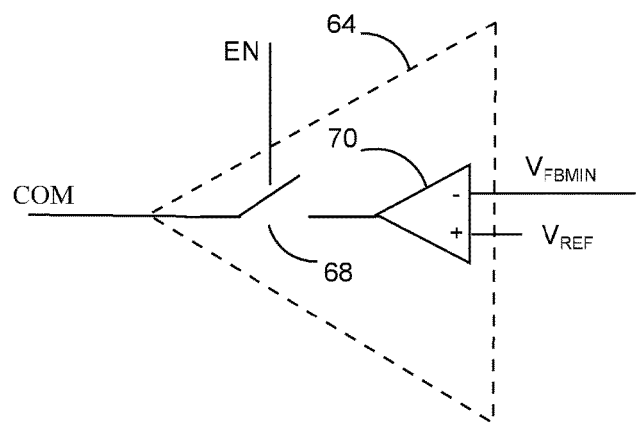
FIG. 6 exemplifies a transconductor.

FIG. 6 exemplifies the transconductor 64, which includes a switch 68 and a transconductor 70. When the switch 68 performs an open circuit, the transconductor 70 is disconnected from the compensation capacitor driven by the transconductor 64, and the output of the transconductor 64 is in high impedance. When the switch 68 performs a short circuit, the transconductor 70 generates output current to the output node of the transconductor 64 based on the difference between the minimum feedback voltage $V_{FBMIN}$ and the reference voltage $V_{REF}$. FIG. 6 is not intended to limit the embodiment of the transconductor 64, however. Based on the teaching in this specification, circuit designers could develop other kinds of transconductor having functions or characteristics similar or the same with the transconductor 64.

Figure 7:
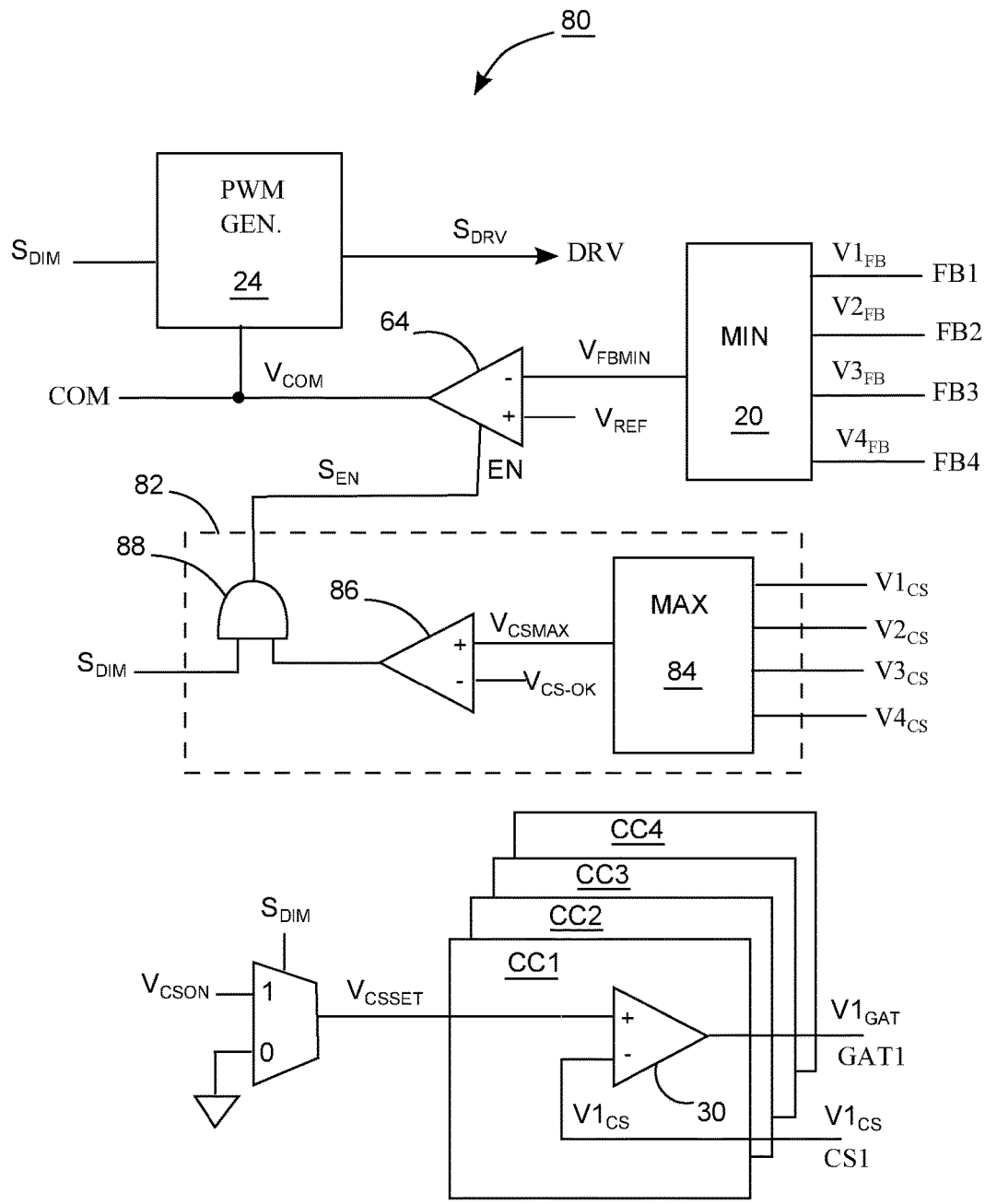
FIG. 7 demonstrates another LED controller according to embodiments of the invention.

FIG. 7 demonstrates another LED controller 80 according to embodiments of the invention. Unlike the decoupling circuit 62 in FIG. 4, the decoupling circuit 82 in FIG. 7 defines a decoupling period $T_{FORCE}$ whose length is not a constant all the time, because, in FIG. 7, the end of the decoupling period $T_{FORCE}$ is in response to the current sense voltages $V1_{CS}$~$V4_{CS}$.

The decoupling circuit 82 includes a maximum selector 84, a comparator 86, and a logic gate 88. Maximum selector 84 provides a maximum current sense voltage $V_{CSMAX}$ based on the maximum among the current sense voltages $V1_{CS}$~$V4_{CS}$. Derivable from the decoupling circuit 82, when the dimming signal $S_{DIM}$ turns into "1" from "0" to claim the start of a dimming ON period $T_{DIM-ON}$, the enabling signal $S_{EN}$ remains at "0" because all the current sense voltages $V1_{CS}$~$V4_{CS}$ are still at about 0V. Only if the maximum among them rises to a certain level such that the maximum current sense voltage $V_{CSMAX}$ exceeds the predetermined reference voltage $V_{CS-OK}$, then the comparator 86 outputs "1" in logic to make the enabling signal $S_{EN}$ becoming "1". In other words, the moment when the dimming signal $S_{DIM}$ turns into "1" from "0" determines the start of the decoupling period $T_{FORCE}$, but it is the maximum among the current sense voltages $V1_{CS}$~$V4_{CS}$ who determines the end of the decoupling period $T_{FORCE}$.

In one embodiment, when the maximum among the current sense voltages $V1_{CS}$~$V4_{CS}$ exceeds the predetermined reference voltage $V_{CS}$-$V_{OK}$, the decoupling circuit claims the conclusion of the decoupling period $T_{FORCE}$, where the predetermined reference voltage $V_{CS-OK}$ is close to, but less than the predetermined voltage $V_{CSON}$, the steady value that all the current sense voltages $V1_{CS}$~$V4_{CS}$ approach for lightening the LED strings S1~S4. For instance, the predetermined voltage $V_{CSON}$ is about 0.4V and the predetermined reference voltage $V_{CS-OK}$ 0.3V. The predetermined reference voltage $V_{CS-OK}$ corresponds to a predetermined driving current $I_{CS-OK}$. When at least one of the driving currents $I1_{LED}$~$I4_{LED}$ exceeds the predetermined driving current $I_{CS-OK}$, the driving currents $I1_{LED}$~$I4_{LED}$ should be very close to their steady values and the decoupling circuit ends the decoupling period $T_{FORCE}$.

Figure 8:
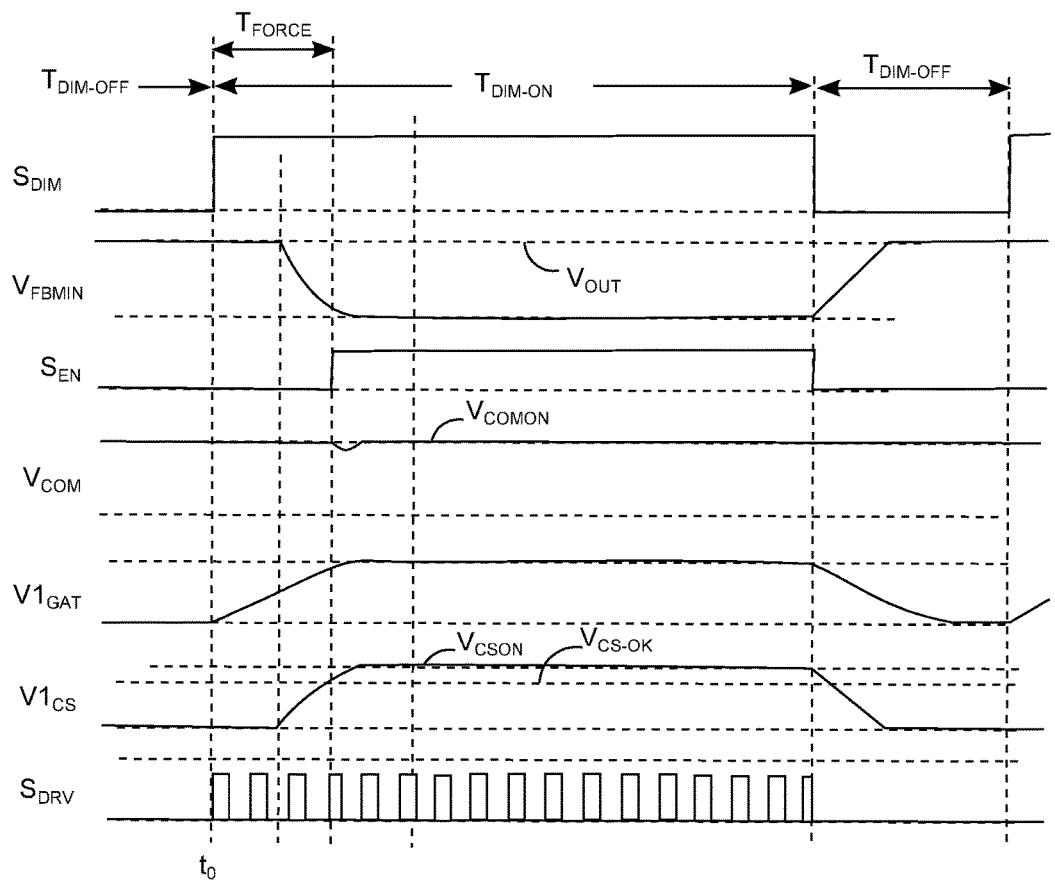
FIG. 8 shows waveforms for signals when the LED controller of FIG. 7 replaces the LED controller in FIG. 1.

FIG. 8 shows waveforms for signals when the LED controller 80 of FIG. 7 replaces the LED controller 14 in FIG. 1. From top to bottom, the waveforms in FIG. 5 are the dimming signal $S_{DIM}$, the minimum feedback voltage $V_{FBMIN}$, and the enabling signal $S_{EN}$, the compensation signal $V_{COM}$, the control voltage $V1_{GAT}$, the current sense voltage $V1_{CS}$, and the PWM signal $S_{DRV}$. As shown in FIG. 8, the decoupling period $T_{FORCE}$ ends when the current sense voltage $V1_{CS}$ exceeds the predetermined reference voltage $V_{CS-OK}$. Similar with FIG. 5, the decoupling period $T_{FORCE}$ in FIG. 8 also causes the current sense voltage $V1_{CS}$ to rise faster and the minimum feedback voltage $V_{FBMIN}$ to fall quicker. Accordingly, better dimming linearity could be expected and flickering to LED strings might be eliminated by the LED controller 80 replacing the LED controller 14 in FIG. 1.

During a decoupling period $T_{FORCE}$, whether it is defined by the decoupling circuit 62 in FIG. 4 or the decoupling circuit 82 in FIG. 7, the control loop fed to the booster 12 is broken and the booster 12 is blindly forced to deliver certain power to the common power node of the LED strings S1~S4. In case that, due to some unknown reasons, the compensation voltage $V_{COM}$ drifts high away from the value $V_{COMON}$ and the decoupling circuit 62 in FIG. 4 defines a over-long decoupling period $T_{FORCE}$, the booster 12 might build up an over-high voltage at the common power node of the LED strings S1~S4, causing damage or risk. Comparatively, the decoupling circuit 82 could prevent this over-high voltage by ending the decoupling period $T_{FORCE}$ at the moment when one of the current sense voltages $V1_{CS}$~$V4_{CS}$ is more than the predetermined reference voltage $V_{CS-OK}$, or, in other words, almost reaches its steady value, such that the control loop to the booster 12 is timely resumed to stabilize the voltage at the common power node.

Embodiments of the invention introduce at the beginning of a dimming ON period a decoupling period, during which a decoupling circuit stops a transconductor driving a compensation capacitor, and makes the compensation capacitor hold a compensation voltage, such that a booster is forced to deliver certain power to drive LED strings. It is believed that embodiments of the invention could result in better dimming linearity and avoid the problem of flickering.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A control circuit capable of controlling the light dimming of a light emitting device, the control circuit comprising:
    a current driver, in response to a dimming signal, for selectively causing a driving current flowing through the light emitting device, wherein the dimming signal is capable of defining a dimming ON period and a dimming OFF period;

a pulse-width modulator for generating a PWM signal to control a power switch, in order to build up a driving voltage at a power node of the light emitting device, wherein the PWM signal is generated in response to a compensation signal;

a feedback circuit, based upon a feedback voltage from the light emitting device, for driving a compensation capacitor to generate the compensation signal; and a decoupling circuit, for defining a decoupling period at the start of the dimming ON period and causing the feedback circuit to not drive the compensation capacitor during the decoupling period;

wherein the feedback circuit comprises a transconductor whose output is in high impedance during the decoupling period and the dimming OFF period.

2. The control circuit as claimed in claim 1, wherein the decoupling period is a constant period of time.

3. The control circuit as claimed in claim 1, wherein the decoupling period ends when the driving current exceeds a predetermined value.

4. The control circuit as claimed in claim 3, wherein during the dimming ON period, the current driver is configured to make the driving current approach a steady constant higher than the predetermined value.

5. The control circuit as claimed in claim 1, wherein the control circuit controls the dimming of several light emitting devices, the control circuit comprises:
the pulse-width modulator for generating the PWM signal to control the power switch, in order to build up a driving voltage at a common power node of the light emitting devices; and
the feedback circuit, based upon a minimum feedback voltage to drive a compensation capacitor, wherein the light emitting devices provide feedback voltages respectively, and the minimum feedback voltage is in response to the minimum among the feedback voltages.

6. The control circuit as claimed in claim 5, wherein the current driver, in response to the dimming signal, is capable of selectively providing driving currents flowing through the light emitting devices respectively.

7. The control circuit as claimed in claim 6, wherein the decoupling period ends when at least one of the driving currents exceeds a predetermined value.

8. The control circuit as claimed in claim 5, wherein the decoupling period is a constant period of time.

9. The control circuit as claimed in claim 1, comprising:
a decoupling switch connected between the feedback circuit and the compensation capacitor for disconnecting the feedback circuit from the compensation capacitor during the decoupling period.

10. The control circuit as claimed in claim 1, wherein the decoupling circuit comprises a pulse generator generating a pulse right after the dimming signal is asserted, and the pulse width of the pulse defines the decoupling period.

11. The control circuit as claimed in claim 1, wherein the decoupling circuit comprises:

a comparator for comparing the driving current with a predetermined value, and for ending the decoupling period when the driving current exceeds the predetermined value.

12. A control method for dimming the light from a light emitting device, comprising:
receiving a dimming signal capable of defining a dimming ON period and a dimming OFF period;
selectively causing, in response to the dimming signal, a driving current flowing through the light emitting device;
generating a PWM signal in response to a compensation signal and the dimming signal to control a power switch for building up a driving voltage powering the light emitting device;
driving a compensation capacitor to generate the compensation signal in response to a feedback voltage provided from the light emitting device;
defining a decoupling period at the start of the dimming ON period;
stopping driving the compensation capacitor during the decoupling period;
driving the compensation capacitor during the dimming ON period except the decoupling period; and
stopping driving the compensation capacitor during the dimming OFF period.

13. The control method as claimed in claim 12, wherein the decoupling period is a constant period of time.

14. The control method as claim in claim 12, comprising:
ending the decoupling period when the driving current exceeds a predetermined value.

15. The control method as claim in claim 14, wherein during the dimming ON period the driving current approaches a steady constant higher than the predetermined value.

16. The control method as claimed in claim 12, comprising:
providing a transconductor for driving the compensation capacitor; and
making the output of the transconductor high impedance during both the dimming OFF period and the decoupling period.

17. The control method as claimed in claim 12, wherein the control method controls the dimming of several light emitting devices, the control method comprises:
selectively causing, in response to the dimming signal, driving currents flowing through the light emitting devices respectively; and
driving a compensation capacitor to generate the compensation signal in response to a minimum feedback voltage, wherein the light emitting devices provide feedback voltages respectively, and the minimum feedback voltage is in response to the minimum among the feedback voltages.

18. The control method as claimed in claim 17, comprising:
ending the decoupling period when at least one of the driving currents exceeds a predetermined value.

* * * * *